US012618377B2

(12) United States Patent
Everaets

(10) Patent No.: US 12,618,377 B2
(45) Date of Patent: May 5, 2026

(54) UNDUCTED PROPELLER GAS TURBINE COMPRISING A COOLING AIR CHANNEL AND A VARIABLE BLEED VALVE EJECTION CHANNEL

(71) Applicants: SAFRAN AIRCRAFT ENGINES, Paris (FR); GENERAL ELECTRIC COMPANY, Schenectady, NY (US)

(72) Inventor: Tom Everaets, Moissy-cramayel (FR)

(73) Assignees: SAFRAN AIRCRAFT ENGINES, Paris (FR); GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/853,744

(22) PCT Filed: Apr. 4, 2022

(86) PCT No.: PCT/FR2022/050626
§ 371 (c)(1),
(2) Date: Oct. 3, 2024

(87) PCT Pub. No.: WO2023/194665
PCT Pub. Date: Oct. 12, 2023

(65) Prior Publication Data
US 2025/0223929 A1    Jul. 10, 2025

Related U.S. Application Data

(60) Provisional application No. 63/328,330, filed on Apr. 7, 2022.

(51) Int. Cl.
*F02C 9/18* (2006.01)
*B64C 11/48* (2006.01)
(Continued)

(52) U.S. Cl.
CPC ................ *F02C 9/18* (2013.01); *B64C 11/48* (2013.01); *B64D 33/08* (2013.01); *F02C 6/08* (2013.01);
(Continued)

(58) Field of Classification Search
CPC ... B64C 11/48; B64D 33/08; B64D 2027/005; B64D 2033/0293; F02C 6/08; F02C 7/04;
(Continued)

(56) References Cited

U.S. PATENT DOCUMENTS 4,546,605 A * 10/1985 Mortimer .............. F01D 17/105
60/785
6,282,881 B1    9/2001 Beutin et al.
(Continued)

OTHER PUBLICATIONS

International Search Report dated Nov. 18, 2022, issued in International Application No. PCT/FR2022/050626.

*Primary Examiner* — Scott J Walthour
(74) *Attorney, Agent, or Firm* — Sughrue Mion, PLLC

(57) ABSTRACT

A gas turbine includes two unducted propellers, a main channel, a compression stage located in the main channel, the main channel supplying the compression stage with air, a cooling channel extending from a cooling inlet opening into the main channel, the cooling inlet being located upstream of the compression stage with reference to a direction of flow of the air through the gas turbine, a heat exchanger located in the cooling channel, an ejection channel opening into the main channel and into the cooling channel so that air passing through the ejection channel ventilates the heat exchanger, and a variable bleed valve that adjust an air flow rate in the ejection channel.

14 Claims, 9 Drawing Sheets

(51) Int. Cl.

| | |
|---|---|
| *B64D 33/08* | (2006.01) |
| *F02C 6/08* | (2006.01) |
| *F02C 7/04* | (2006.01) |
| *F02C 7/042* | (2006.01) |
| *F02C 7/057* | (2006.01) |
| *F02C 7/18* | (2006.01) |
| *F02K 3/077* | (2006.01) |
| *B64D 33/02* | (2006.01) |

(52) U.S. Cl.
CPC ................ *F02C 7/04* (2013.01); *F02C 7/042* (2013.01); *F02C 7/057* (2013.01); *F02C 7/18* (2013.01); *F02K 3/077* (2013.01); *B64D 2033/0293* (2013.01); *F05D 2220/323* (2013.01); *F05D 2260/213* (2013.01)

(58) Field of Classification Search
CPC .. F02C 7/042; F02C 7/057; F02C 9/18; F02K 3/065; F02K 3/072; F02K 3/077
See application file for complete search history.

(56) References Cited

U.S. PATENT DOCUMENTS

| | | | |
|---|---|---|---|
| 2011/0179767 A1 | 7/2011 | Rinjonneau et al. | |
| 2011/0268563 A1 | 11/2011 | Stretton | |
| 2012/0272658 A1* | 11/2012 | Murphy ................. | F02C 7/185 |
| | | | 165/96 |
| 2015/0059315 A1* | 3/2015 | Siering ................ | F04D 27/023 |
| | | | 60/226.3 |
| 2015/0300265 A1 | 10/2015 | Suciu et al. | |
| 2019/0332126 A1* | 10/2019 | Irwin, III ............ | B64C 29/0033 |
| 2021/0108597 A1 | 4/2021 | Ostdiek et al. | |

* cited by examiner

UNDUCTED PROPELLER GAS TURBINE COMPRISING A COOLING AIR CHANNEL AND A VARIABLE BLEED VALVE EJECTION CHANNEL

CROSS REFERENCE TO RELATED APPLICATION

This application is a National Stage of International Application No. PCT/FR2022/050626 filed Apr. 4, 2022, the contents of which being herein incorporated by reference in its entirety.

FIELD OF THE INVENTION

The invention relates to a propulsion gas turbine with an unducted propeller and particularly the air cooling in such systems. The invention is of particular interest when it is applied to gas turbomachines for aircraft propulsion.

STATE OF THE ART

It is known a gas turbine 10 comprising a fan composed of an unducted upstream propeller and, downstream, of an unducted downstream propeller or fixed rectifier.

The terms upstream and downstream are defined in relation to the general direction of flow of the gases through the gas turbine.

The propulsion system extends along an axis and includes successively, in the direction of flow of the gases in the turbomachine, the fan, an air inlet configured to supply with air:

a compression section which may comprise a low-pressure compressor and a high-pressure compressor,
a combustion chamber,
a turbine section which may comprise a high-pressure turbine, and
a low-pressure turbine.

The air entering through the air inlet is finally expelled from the gas turbine through a main outlet, located downstream of the low-pressure turbine.

The upstream propeller and the low-pressure compressor are driven in rotation by the low-pressure turbine via a first transmission shaft, while the high-pressure compressor is driven in rotation by the high-pressure turbine via a second transmission shaft.

In operation, an air flow is compressed by the low-pressure and high-pressure compressors and supplies combustion into the combustion chamber, the expansion of the combustion gases of which drives the high-pressure and low-pressure turbines. The air propelled by the upstream propeller and the combustion gases exiting through the gas outlet downstream of the turbines exert a reaction thrust on the propulsion system and, through it, on a vehicle or machine such as an aircraft.

A speed reduction gearbox is driven by the first transmission shaft, and then drives the upstream propeller which rotates at a reduced rotational speed compared to the rotational speed of the transmission shaft.

The air entering through the air inlet flows through a channel up to the low-pressure compressor. Upstream of the low-pressure compressor, a rotor with moving blades which is placed in the channel is driven by the transmission shaft. The rotor with moving blades comprises a plurality of compression blades and increases, downstream, the pressure of the air circulating in the channel. A stator with fixed vanes is located upstream and/or downstream of the rotor with moving blade. A complementary channel extends from the channel, downstream of the input rectifier, up to a complementary outlet opening onto the outside of the body of the propulsion system. The complementary channel has an annular shape and extends about the axis of the propulsion system. The air outlet is located downstream of the downstream fixed propeller and upstream of the main outlet.

The complementary channel allows cooling a heat exchanger, in particular with the aim of cooling the speed reduction gearbox. Such a complementary channel also contributes to part of the thrust of the engine.

However, such a complementary channel complicates the structure of the propulsion system.

There is therefore a need for a simpler structure of the complementary channel which ensures a cooling function.

DISCLOSURE OF THE INVENTION

One aim of the invention is to propose a simpler structure allowing greater cooling power than in the prior art.

The aim is achieved within the framework of the present invention thanks to a gas turbine comprising:

two unducted propellers,
a main channel,
at least one compression stage located in the main channel, the main channel being configured to supply the compression stage with air,
a cooling channel extending from a cooling inlet opening into the main channel, the cooling inlet being located upstream of the or each compression stage with reference to a direction of flow of the air,
a heat exchanger located in the cooling channel,
an ejection channel opening into the main channel and into the cooling channel so that the air passing through the ejection channel ventilates the heat exchanger, and
a variable bleed valve configured to adjust an air flow rate in the ejection channel.

The terms upstream and downstream are defined in relation to the direction of flow of the air through the gas turbine.

The cooling inlet being located upstream of any compression stage in the main channel, all the compression stages located in the main channel are thus grouped together downstream of the cooling inlet, which allows simplifying the structure relative to the prior art. In addition, the air entering the cooling channel is not, unlike the prior art, heated by a compression stage located in the main channel upstream of the cooling inlet so that the air entering the cooling channel is cooler and provides greater cooling power relative to the prior art.

The following characteristics can also be provided in the gas turbine:

a combustion chamber located downstream of the compression stage relative to the direction of flow of the air,
the main channel extending from a main inlet which is located between the two propellers,
the direction of flow of the air directed from the main inlet to the compression stage,
the cooling channel extending from the cooling inlet up to a cooling outlet opening to the outside of the gas turbine located downstream of the unducted propellers
the ejection channel opening into the main channel downstream of the compression stage.

Such a gas turbine is advantageously and optionally completed by the different following characteristics taken alone or in combination:

the variable bleed valve comprises a rotary valve configured to be rotated;

the variable bleed valve comprises a sliding door;

a stream modulator configured to adjust a flow rate of a stream passing through the cooling inlet of the main channel to the cooling channel;

the stream modulator is placed at the cooling inlet;

the stream modulator is placed at the cooling outlet, the modulator comprising a rotary valve configured to be rotated;

the stream modulator comprises a variable section of the cooling channel;

the stream modulator comprises a rotary valve configured to be rotated about an axis;

the axis is placed upstream of the cooling inlet, the rotary valve being configured to be rotated between a closed position where the rotary valve covers the cooling inlet and an open position where the rotary valve is inside the cooling channel;

the axis is placed downstream of the cooling inlet, the rotary valve being configured to be rotated between a closed position where the rotary valve covers the cooling inlet and an open position where the rotary valve is outside the cooling channel; and the stream modulator comprises a sliding door.

The invention further relates to an aircraft comprising a gas turbine as described above.

The invention also relates to a method for controlling a gas turbine as described above, the method comprising, when the rotational speed of one among the two propellers exceeds a first predetermined speed, a step of canceling the air flow rate flowing from the main channel into the ejection channel, and optionally a step of opening the cooling channel so that air flows from the main channel into the cooling channel.

Such a method is advantageously and optionally completed by the different following characteristics taken alone or in combination:

the first predetermined speed is equal to 80% of a maximum rotational speed of the propeller;

a step of adapting an air flow rate passing through the cooling inlet of the main channel to the cooling channel relative to a cooling requirement of the heat exchanger, the gas turbine comprising a stream modulator configured to adjust a flow rate of a stream passing through the cooling inlet of the main channel to the cooling channel;

when the rotational speed of the propeller is lower than the first predetermined speed and greater than a second predetermined speed, a step of partially opening the variable bleed valve so that air flows from the main channel to the ejection channel;

when the rotational speed of the propeller is lower than the first predetermined speed and greater than a second predetermined speed, a step of reducing an air flow rate passing through the cooling inlet of the main channel to the cooling channel, the ejection channel opening into the cooling channel downstream of the stream modulator;

when the rotational speed of the unducted propeller is lower than a second predetermined speed lower than the first predetermined speed or when the dynamic pressure at the inlet of the main channel passes below a minimum value, a step of totally opening the ejection channel and a step of canceling an air flow rate passing through the cooling inlet of the main channel to the cooling channel, the ejection channel opening into the cooling channel downstream of the stream modulator; and the second predetermined speed is comprised between 40% and 80% of a maximum rotational speed of the propeller.

DESCRIPTION OF THE FIGURES

Other characteristics and advantages of the invention will emerge from the following description, which is purely illustrative and non-limiting, and should be read in relation to the appended drawings in which.

DETAILED DESCRIPTION OF THE INVENTION

Gas Turbine

Figure 1:
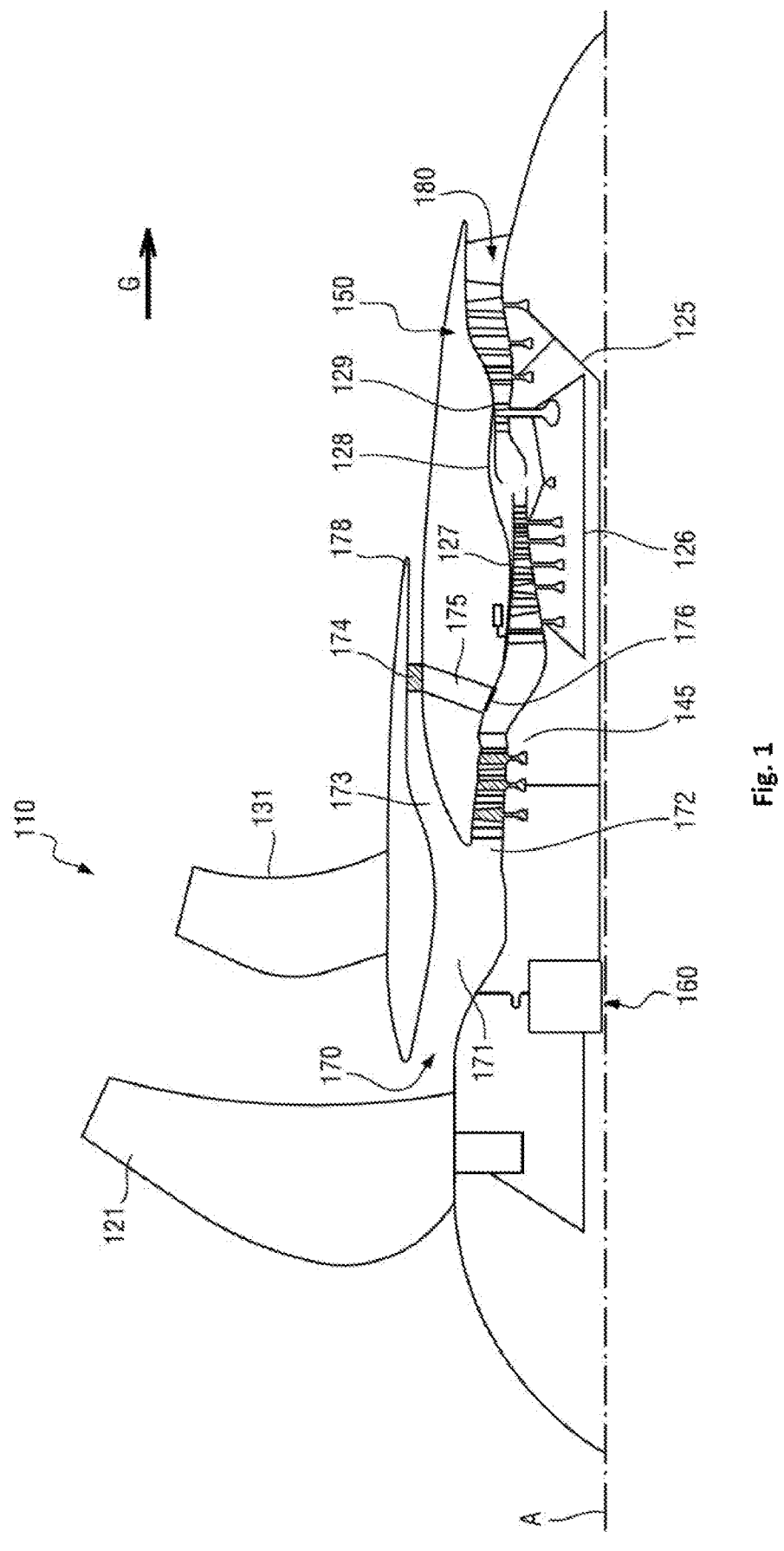
FIG. 1 is a schematic representation of a gas turbine according to one embodiment of the invention.

FIG. 1 represents a gas turbine 110 according to one embodiment of the invention.

The gas turbine 110 extends along an axis A. The gas turbine 110 comprises two unducted propellers 121 and 131 which form a fan. Particularly, the fan is composed of the unducted upstream propeller 121 movable in rotation about the axis A which is located upstream of the unducted downstream propeller 131 or fixed rectifier.

The gas turbine also comprises a main channel 170 which extends through the turbine substantially parallel to the axis of the turbine from a main inlet 170 to a main outlet 180 opening to the outside of the casing of the turbine. The main channel 171 is configured to circulate an air stream along a general direction of flow of the gases, represented by the arrow G in FIG. 1, from the main inlet 170 to the main outlet 180 which is therefore located downstream of the main inlet 170.

The terms upstream and downstream are defined in relation to the general direction of flow of the gases through the gas turbine.

Between the two propellers, that is to say downstream of an upstream propeller 121 and upstream of a downstream propeller 131, the gas turbine has in its casing the main inlet 170 of the main channel 171.

In this same embodiment of the invention, and throughout the main channel 171, the gas turbine 110 includes successively in the direction G of flow of the gases:

at least one compression stage forming for example a compression section, the compression section being possibly able to comprise a low-pressure compressor 145 upstream and a high-pressure compressor 127 downstream, a combustion chamber 128.

By compression stage is meant a group formed by a rotor with moving blades (or a moving blade wheel) and a stator with fixed vanes (or a fixed blade wheel), the rotor with moving blades being located upstream or downstream of the stator with fixed vanes. This compression stage, when the rotor with moving blades is rotating, creates an increase in air pressure downstream of the stage compared to upstream of the stage.

In the main channel 171, the gas turbine 110 further includes, downstream of the combustion chamber 128, a turbine section which may comprise a high-pressure turbine 129 upstream and a low-pressure turbine 150 downstream. The gas turbine is also supplied with air through the main channel 171.

The main channel 171 is configured to supply with air entering through the air inlet 170 at least one compression stage and the combustion chamber. More specifically, it is the air compressed by the at least one compression stage that is moved in the main channel 171 up to the combustion chamber and that ensures its supply. This supply takes place in the direction of flow G from the main inlet 170 to the compression stages.

The gas turbine 110 also comprises a cooling channel 173 which extends from a cooling inlet opening into the main channel 171 to a cooling outlet 178 opening to the outside of the gas turbine 110. The cooling inlet is located upstream of the or each compression stage of the main channel 171. In other words, no compression stage is located between the main inlet 170 and the cooling inlet. In other words, any compression stage in the main channel 171 is located downstream of the cooling inlet.

The location of the cooling inlet upstream of all the compression stages in the main channel corresponds to an arrangement of the portion of the turbine around the cooling inlet according to which any compression stage which is located upstream of this inlet is replaced by a compression stage in the low-pressure compressor, the cooling inlet being upstream of this low-pressure compressor. Such a configuration is advantageous because on the one hand it takes up less space at the main channel upstream of the combustion chamber and on the other hand it simplifies the structure of the complementary channel, here referred to as cooling channel. Indeed, the elimination of a compression stage upstream of the cooling inlet means the elimination of the rotor with moving blades and the stator with fixed vanes. Such a configuration also allows obtaining higher overall compression efficiency.

The cooling channel 173 is located radially further outward than the main channel 171, i.e. than the main channel is located between the axis A of the gas turbine 110 and the cooling channel 173. The cooling channel 173 may have an annular shape and extend about the axis A of the gas turbine 110. The air outlet 178 is located downstream of the fixed downstream propeller 131 and upstream of the main outlet 180.

Still in the same embodiment of the invention illustrated in FIG. 1, the gas turbine 110 comprises a heat exchanger 174 located in the cooling channel. The heat exchanger 174 is configured to be cooled by the air flowing through the main duct. The heat exchanger can in particular be used to ensure the cooling of a speed reduction gearbox configured to drive in rotation the upstream propeller 121. Different heat exchanger technologies can be envisaged, such as volume or surface exchangers, fin exchangers, etc.

According to this same embodiment, the gas turbine 110 comprises an ejection channel 175 opening into the main channel 170 as well as a variable bleed valve 176 configured to adjust a flow rate of a stream flowing through the ejection channel 175.

The ejection inlet of the ejection channel which opens into the main channel 170 is located downstream of at least one compression stage located in the main channel, so that the ejection inlet is located downstream of the cooling inlet and that these inlets are separated by at least one compression stage. The ejection inlet can for example be located downstream of the low-pressure compressor 145.

The ejection channel 175 extends from the main channel radially outwardly.

The ejection channel 175 opens into the cooling channel 173 downstream of the ejection inlet and upstream of the cooling outlet 178.

The ejection channel 175 opens into the cooling channel 173 so that the air passing through the ejection channel ventilates the heat exchanger.

In other words, a stream flowing along the direction of flow and passing through the ejection channel ventilates the heat exchanger downstream. This corresponds to the ejection channel 175 which opens into the cooling channel 173 on or upstream of the heat exchanger 174, i.e. the position in the cooling channel 173 where the ejection channel 175 is a through ejection channel is the position of the heat exchanger 174 in the cooling channel or a position further upstream than the position of the heat exchanger 174 in the cooling channel.

The variable bleed valve 176 can be located at the intersection between the ejection channel 175 and the main channel 170. This intersection defines an ejection inlet for the ejection channel 175.

According to a particular aspect of the invention, the variable bleed valve 176 comprises a rotary valve configured to be rotated about a fixed axis, as illustrated in FIGS. 2 to 5 and 7 to 9.

The fixed axis can be located downstream of the ejection channel 175 and placed to rotate the valve between a closed position where the valve covers the ejection inlet thus separating the ejection channel and the main channel, and an open position where the valve is inside the main channel, this is called in this case scooping valve. As a variant, in the open position, the valve can be inside the ejection channel, this is called in this case non-scooping valve. In this variant, the valve in the open position may be pressed against a wall of the ejection channel, or even fit into and be continuous with a wall of the ejection channel.

Figure 6:

According to another particular aspect of the invention, the variable bleed valve 176 comprises a sliding door, as illustrated in FIG. 6. The sliding door is configured to be translated along a direction parallel to the ejection inlet and having a non-zero projection along the general direction of flow of the gases. The sliding door can slide downstream up to a closed position where the valve covers the ejection inlet thus separating the ejection channel and the main channel, and upstream up to an open position where the sliding door is located upstream of the ejection inlet. As a variant, the sliding door can slide downstream up to an open position where the sliding door is located downstream of the ejection inlet, and upstream up to a closed position where the valve covers the ejection inlet thus separating the ejection channel and the main channel.

As an option of the previously presented implementations of the invention, the turbine 110 comprises a stream modulator 172 configured to adjust a flow rate of a stream passing through the cooling inlet of the main channel 171 to the cooling channel 173.

The stream modulator 172 can be located at the intersection between the cooling channel 173 and the main channel 170, defining the cooling inlet.

In this case, the ejection channel opens into the cooling channel downstream of the stream modulator 172.

Figure 2:
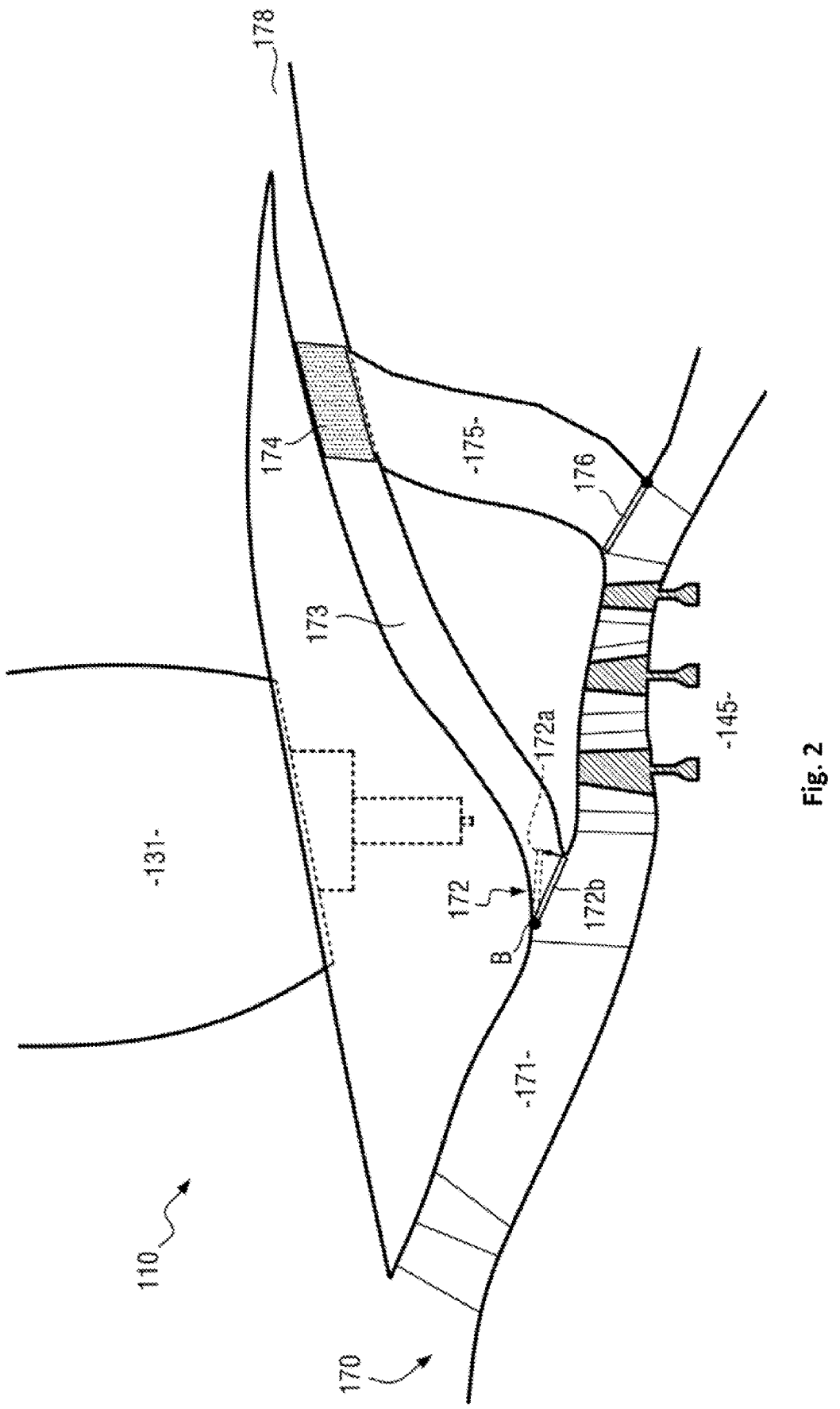
FIGS. 2 to 9 are schematic representations of a detail of the gas turbine according to different embodiments of the invention.
Figure 3:
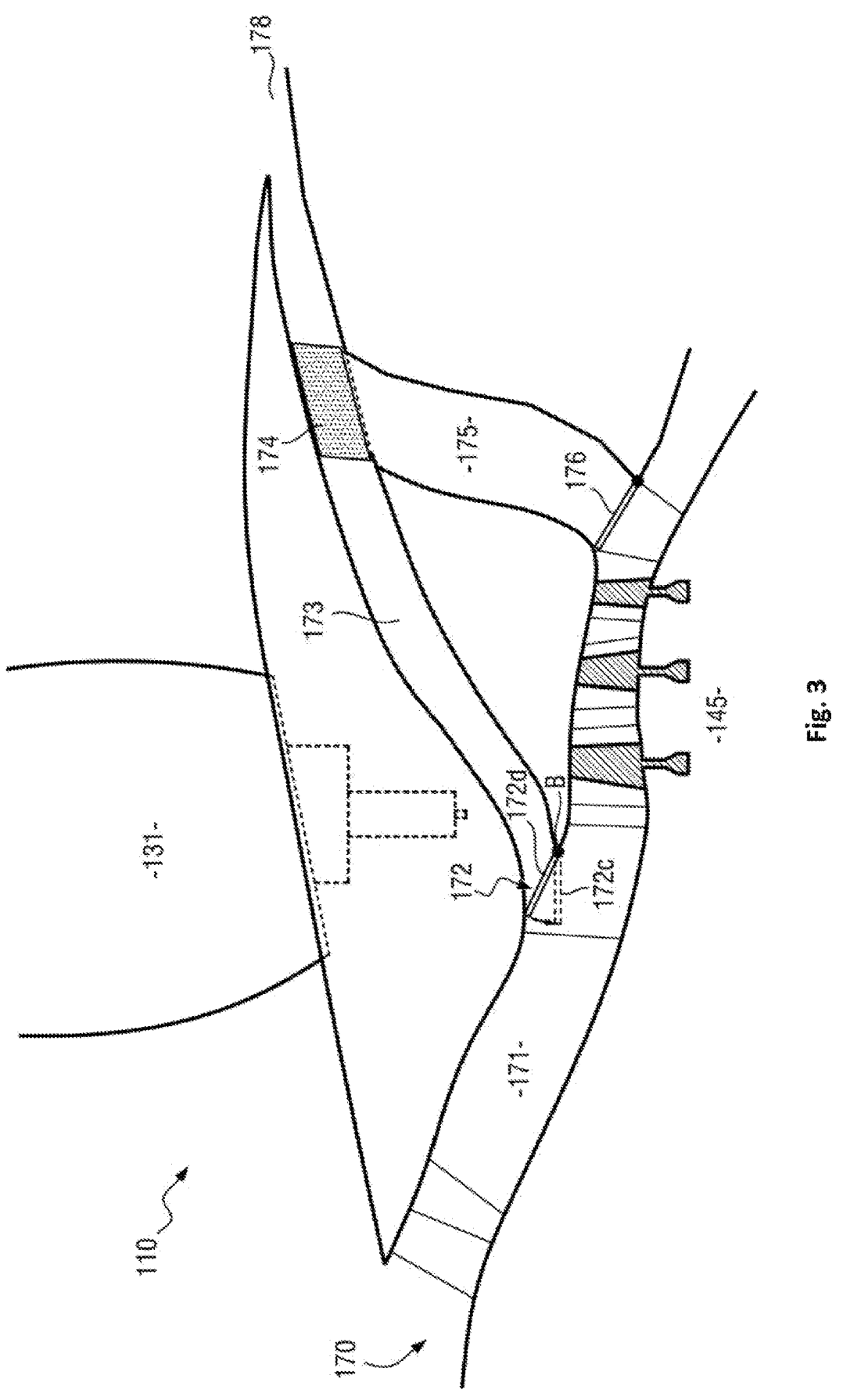

When the stream modulator 172 is located at this location, the stream modulator can be in a first option a rotary valve configured to be rotated about a fixed axis denoted B in FIGS. 2 and 3.

This fixed axis can be placed upstream of the cooling inlet. The rotary valve is then configured to be rotated between a closed position 172b where the valve covers the cooling inlet and an open position 172*a* where the valve is inside the cooling channel, as illustrated in FIG. 2.

This fixed axis can as a variant be placed downstream of the cooling inlet. The rotary valve is then configured to be rotated between a closed position 172*d* where the valve covers the cooling inlet and an open position 172*c* where the valve is inside the cooling channel, as illustrated in FIG. 3.

Figure 5:
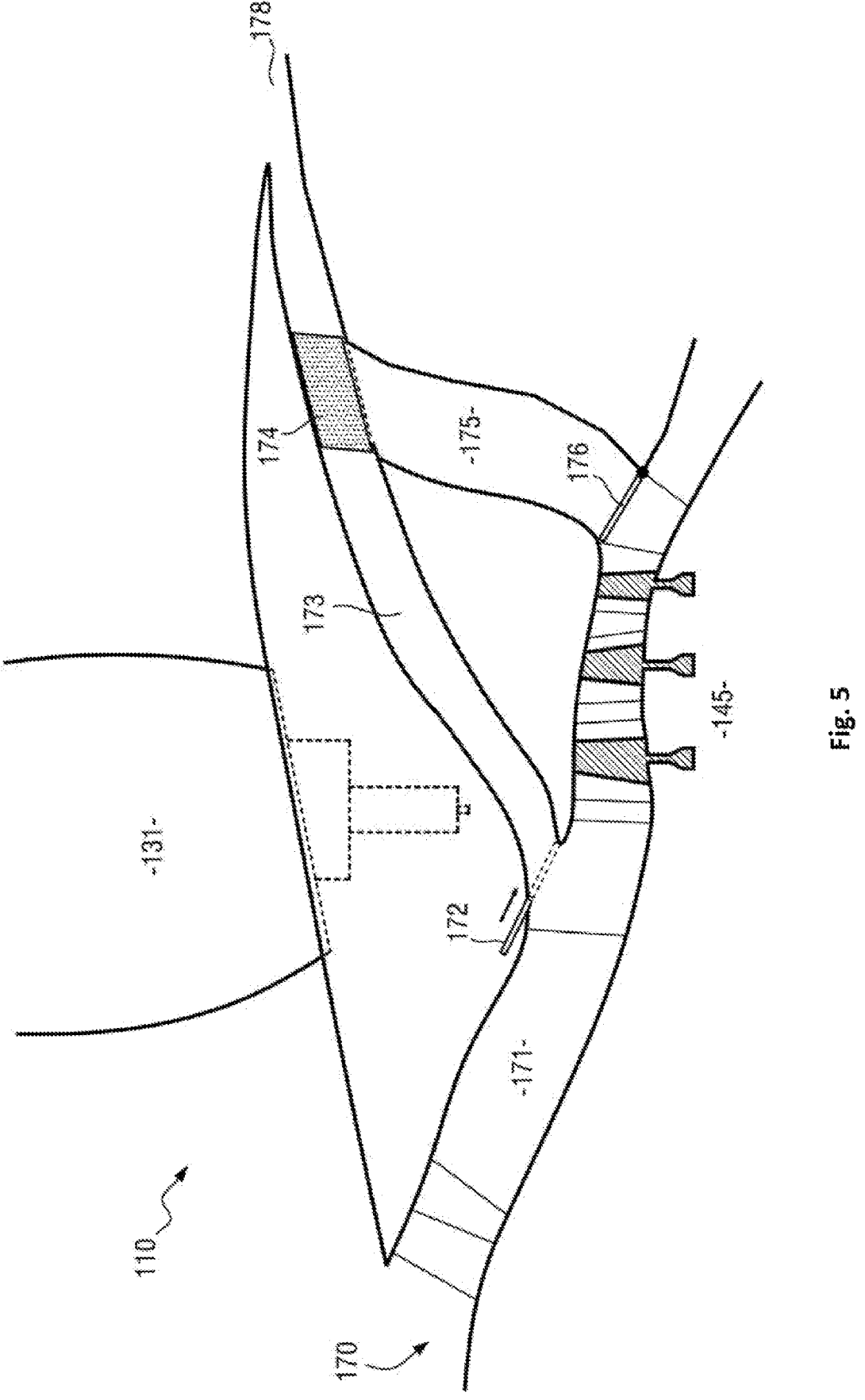

When the stream modulator 172 is located at the cooling inlet, the stream modulator can be in a second option a sliding door, as illustrated in FIGS. 5 and 6. The sliding door is configured to be translated along a direction parallel to the cooling inlet and having a non-zero projection along the general direction of flow of the gases. The sliding door can slide downstream up to a closed position where the stream modulator covers the cooling inlet thus separating the cooling channel and the main channel, and upstream up to an open position where the sliding door is located upstream of the cooling inlet. As a variant, the sliding door can slide downstream up to an open position where the sliding door is located downstream of the ejection inlet, and upstream up to a closed position where the valve covers the ejection inlet thus separating the ejection channel and the main channel.

In summary, when the stream modulator 172 is placed at the cooling inlet:

the stream modulator 172 may comprise a rotary valve configured to be rotated about an axis, and advantageously the axis is placed upstream of the cooling inlet, the rotary valve being configured to be rotated between a closed position where the rotary valve covers the cooling inlet and an open position where the rotary valve is inside the cooling channel 173, or the axis is placed downstream of the cooling inlet, the rotary valve being configured to be rotated between a closed position where the rotary valve covers the cooling inlet and an open position where the rotary valve is outside the cooling channel 173;

the stream modulator 172 can comprise a sliding door.

Figure 4:
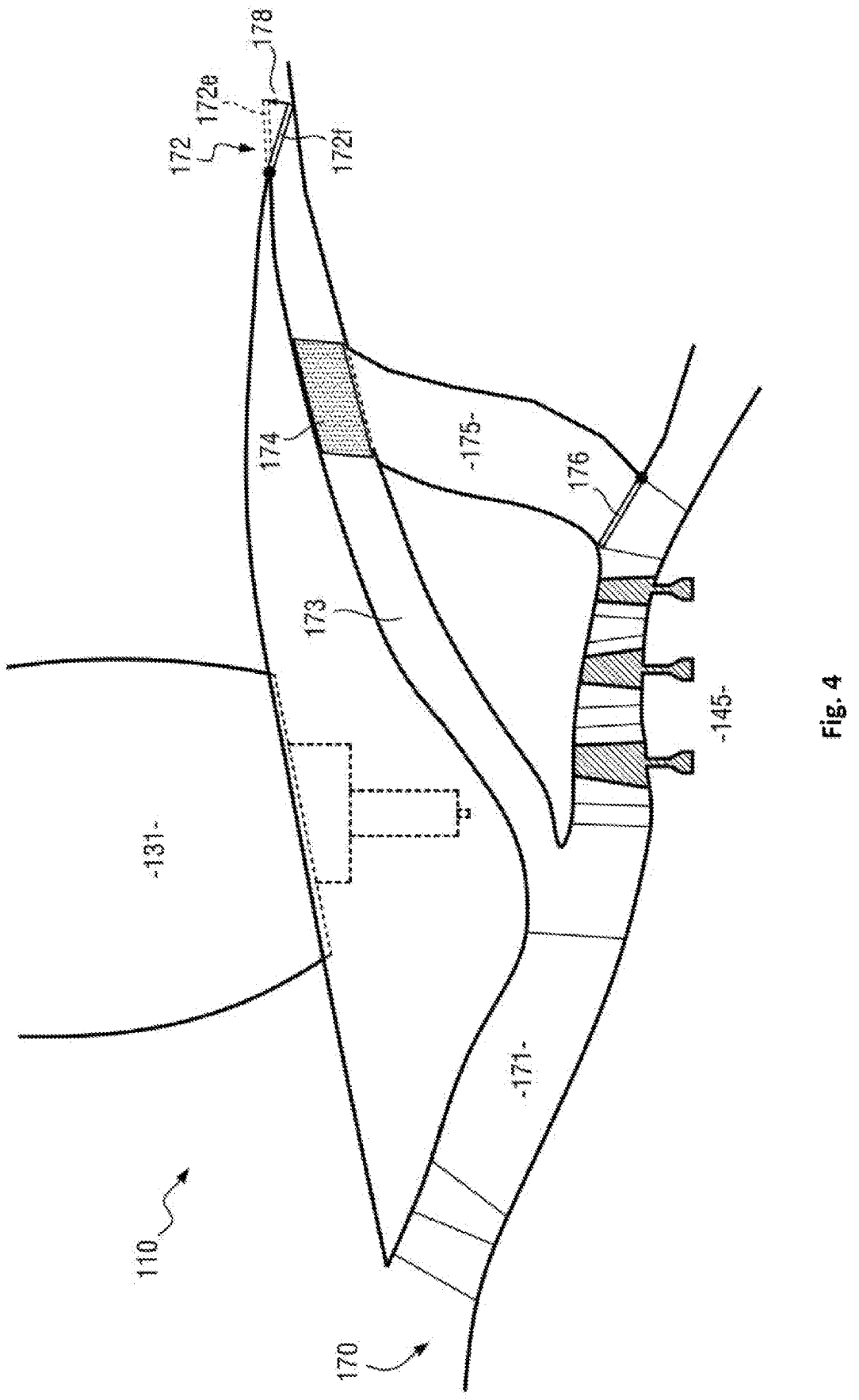

The stream modulator 172 can also be located at the cooling outlet 178, as illustrated in FIG. 4. In this case, the ejection channel opens into the cooling channel upstream of the stream modulator 172.

In this case, the stream modulator 172 is a rotary valve configured to be rotated about a fixed axis. This fixed axis is placed upstream of the cooling outlet 178. The rotary valve is then configured to be rotated between a closed position 172*f* where the valve covers the cooling outlet and an open position 172*e* where the valve is outside the cooling channel, as illustrated in FIG. 4. Finally, the stream modulator 172 can be a variable section of the cooling channel. This variable section can be located at different places in the cooling channel. The ejection channel can open into the cooling channel either upstream or downstream of the variable section formed by the stream modulator 172.

Control Method

A gas turbine as just described allows implementing a control method according to the invention to optimize the cooling of the heat exchanger 174.

In a first implementation, the control method comprises, when the rotational speed of an unducted propeller exceeds a first predetermined speed, a step of canceling the air flow rate flowing from the main channel 171 into the ejection channel 175, and optionally a step of opening the cooling channel so that a stream flows through the cooling channel.

The unducted propeller mentioned above is the upstream propeller 121 which is movable. This propeller compresses the downstream air including the air entering the main channel, and particularly the incoming air passing from the main channel to the cooling channel.

In the absence of a stream modulator 172, the air passes freely from the main channel 171 to the cooling channel 173, therefore no step of opening the cooling channel is necessary.

Figure 7:
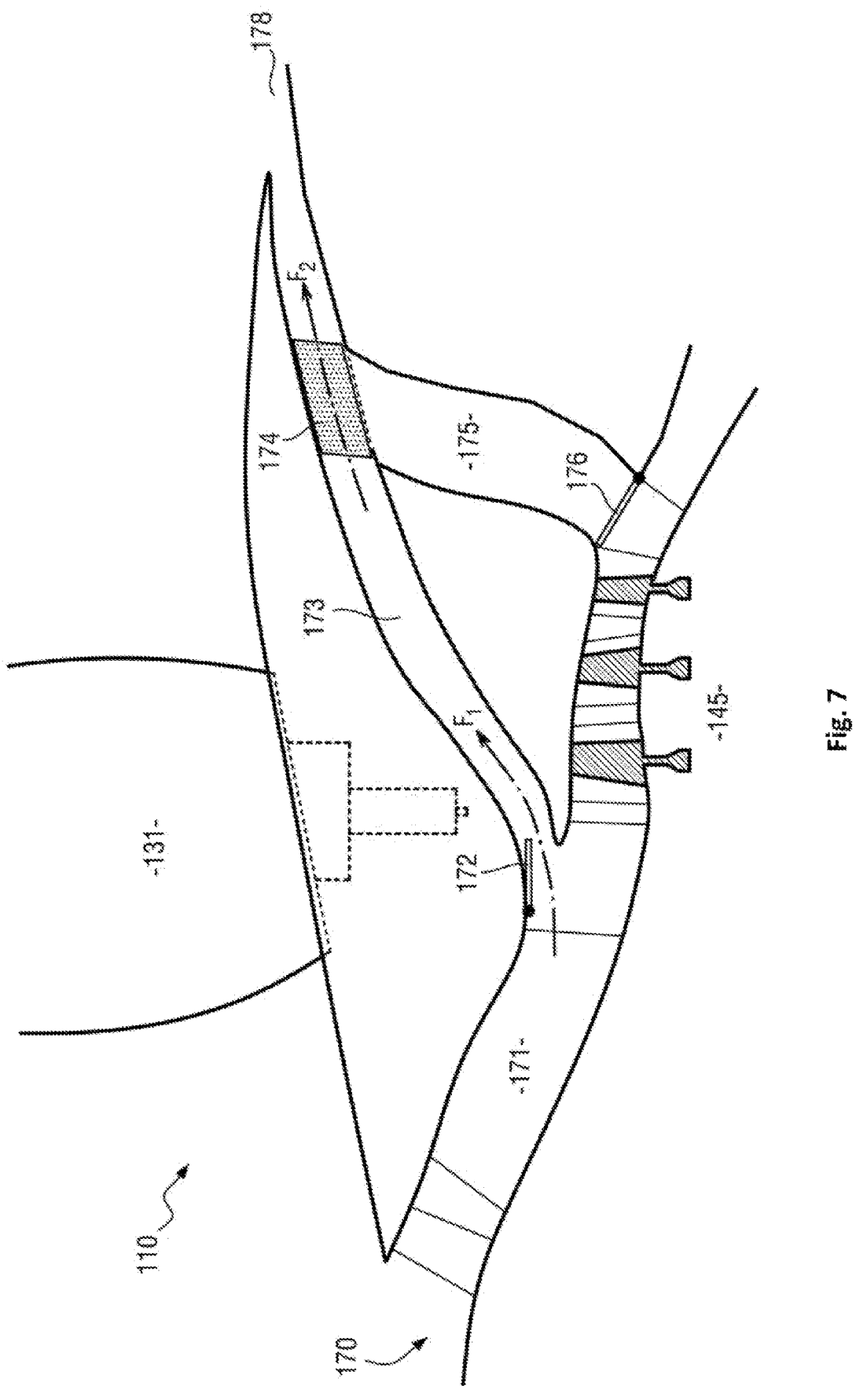

In the option where a stream modulator 172 is present, a step of opening the cooling channel allows configuring the modulator 172 to allow the passage of air so that a stream flows from the main channel 171 into the cooling channel 173. FIG. 7 illustrates the situation where the gas turbine comprises the stream modulator 172 at the cooling inlet, the stream modulator 172 being configured to let air pass between the main channel 171 and the cooling channel 173.

The step of canceling the flow rate of the stream flowing through the ejection channel is carried out by the monitoring of the variable bleed valve 176 to close the passage between the main channel and the ejection channel.

As illustrated in FIG. 7, the bleed valve 176 blocks the passage of air between the main channel 171 and the ejection channel 175.

In this situation, an air stream F1 passes from the main channel to the cooling channel 173, while no air stream passes from the main channel to the ejection channel 175. The air stream F2 which passes through the exchanger 174, which stream F2 is the extension of the air stream F1, allows ventilating and cooling the exchanger 174.

The first predetermined speed corresponds to a speed beyond which the open cooling channel is traversed by an air flow rate sufficient to cool the heat exchanger 174 satisfactorily. This air flow rate through the cooling channel is ensured by the compression of the blade shank of the upstream propeller 121 and by the dynamic flight pressure. These two pressure factors allow a ventilation of the exchanger.

The first predetermined speed may correspond to a cruising speed of an aircraft set in motion by the gas turbine. The cruising speed corresponds to the speed reached in normal flight of the aircraft between take-off and landing. The first predetermined speed can be equal to 80% of the maximum rotational speed of the propeller.

Compared to the prior art in which a rotor with moving blades is located upstream of the cooling inlet, the flow rate in the cooling channel necessary to ensure sufficient ventilation of the exchanger is reduced. Indeed, the absence of the rotor with moving blades makes the air stream passing from the main channel to the cooling channel cooler and at identical flow rate, the cooling power is greater. The air stream F1, F2 through the cooling channel also depends on the section of the cooling outlet 178 opening to the outside of the gas turbine 110. This section of the cooling outlet 178 is dimensioned to meet the cooling requirement.

Optionally in the first implementation, the method can be applied to a gas turbine comprising a stream modulator 172 as presented above. In this case, the method can comprise a step of adapting an air flow rate passing through the cooling inlet of the main channel 171 to the cooling channel 173 relative to a cooling requirement of the heat exchanger 174. The supply of the third stream is actively regulated by the stream modulator which allows optimizing the performance according to the cooling needs of the engine.

In a second implementation, the method further comprises relative to the first implementation, when the rotational speed of the unducted propeller is lower than the first predetermined speed and exceeds a second predetermined speed, a step of partially opening the bleed valve so that a stream flows through the ejection channel.

Figure 8:
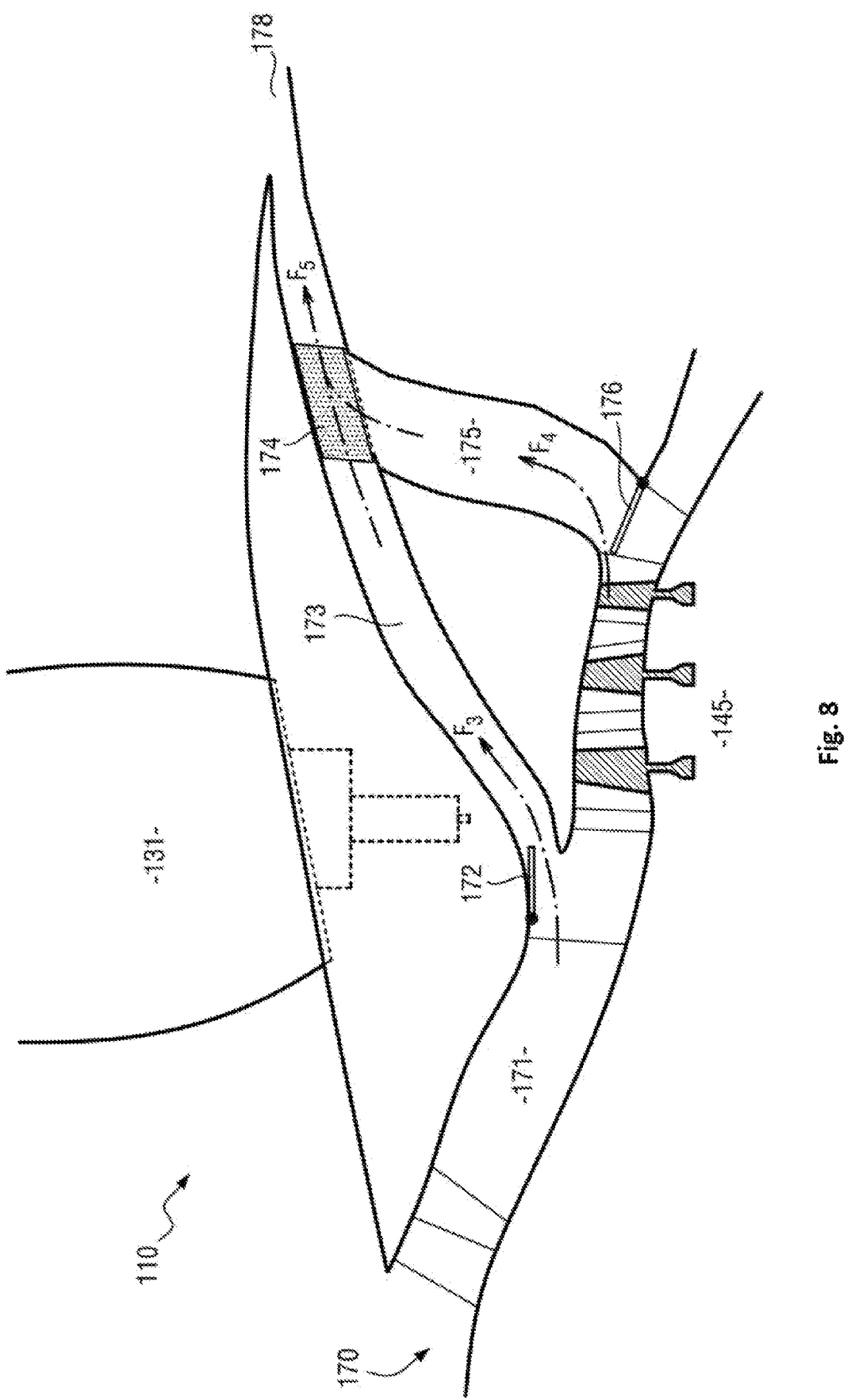

FIG. 8 illustrates this situation.

When the speed of the propeller decreases and takes a value below the first predetermined value, the air flow rate F3 passing from the main channel 171 to the cooling channel 173 through the cooling inlet is not sufficient to cool the heat exchanger 174. In this case, the bleed valve 176 is activated to open the air passage between the main channel and the ejection inlet of the ejection channel. A second air stream F4 compressed by at least one compression stage 145 located upstream of the ejection inlet flows through the ejection channel 175. This second stream F4 opens into the cooling channel on or upstream of the heat exchanger 174. The overall stream F5 flowing through the heat exchanger 174 is the sum of the streams F3 and F4. In this way, the exchanger can be cooled satisfactorily despite the decrease of the rotational speed of the propeller.

The geometry of the cooling channel and of the ejection channel can be designed in such a way as to promote the flow in the cooling channel by utilizing the Venturi effect produced in the cooling channel by the flow of the second stream in the ejection channel.

The second predetermined speed may correspond to the speed of an aircraft set in motion by the gas turbine during take-off or during descent idle. The second predetermined speed is then comprised between 40% and 80% of the maximum rotational speed of the propeller.

As an option of the second implementation, the method can be applied to a gas turbine comprising a stream modulator 172 which is placed in the cooling channel 173 further upstream than the position where the ejection channel 175 opens into the cooling channel 173. In this case, the method may further comprise relative to the second implementation, when the rotational speed of the unducted propeller is lower than the first predetermined speed and exceeds a second predetermined speed, or when the dynamic pressure at the inlet of the main channel 170 falls below a minimum value, a step of reducing the air stream passing through the cooling inlet from the main channel 171 to the cooling channel 173.

The stream reduction is produced by the stream modulator 172 which is partially closed to reduce the stream passing from the main channel to the cooling channel. As stated previously, the second stream produced by the ejection channel allows additional cooling of the exchanger, but it may also be sufficient on its own to cool the exchanger 174 as desired. Indeed, when the rotational speed of the propeller is decreased, the heating of the engine is also decreased. The cooling requirement may therefore be small enough that the air flow rate passing through the ejection channel is sufficient. In this case, it is possible to close the stream modulator 172. As the latter is placed upstream of the ejection channel, its closing does not reduce the air flow rate from the ejection channel 175 into the cooling channel 173. The closing of the modulator can be complete so that there is no air stream passing from the main channel 171 into the cooling channel 173. This also allows avoiding backflow of the stream passing through the ejection channel 175 and which would then pass through the cooling channel 173 upstream, that is to say towards the cooling inlet.

In a third implementation, the method is applied to a gas turbine comprising a stream modulator 172 which is placed in the cooling channel further upstream than the position where the ejection channel opens into the cooling channel. This third implementation comprises, in addition to the steps of the method according to the first implementation and/or according to the second implementation, when the rotational speed of the unducted propeller is lower than the second predetermined speed or when the dynamic pressure at the inlet of the main channel 170 passes below a minimum value, a step of totally opening the ejection channel 175 and a step of canceling an air stream passing through the cooling inlet from the main channel to the cooling channel 173.

Figure 9:
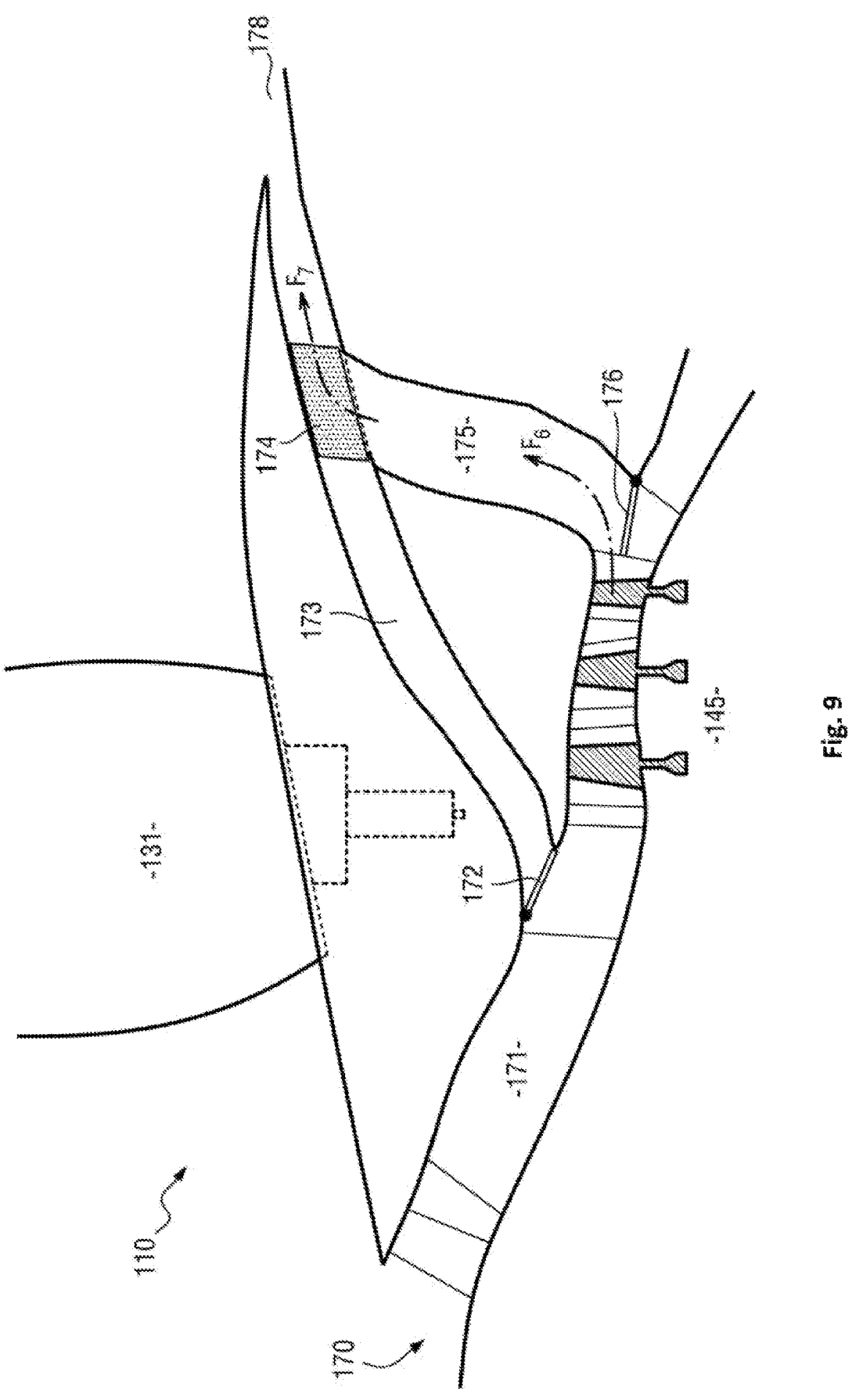

FIG. 9 illustrates this situation.

When the speed of the propeller decreases and takes a value below the second predetermined value, or when the dynamic pressure at the inlet of the main channel 170 falls below a minimum value, the air flow rate passing through the cooling channel produces even lower ventilation and cooling of the heat exchanger 174. The second stream passing through the ejection channel is then the only one to allow sufficient cooling of the exchanger.

The variable bleed valve 176 is then configured to maximize the air stream F6 passing from the main channel 171 to the ejection channel 175.

The stream modulator 172 is then configured to cancel the air stream passing from the main channel into the cooling channel through the cooling inlet. As the stream modulator is placed upstream of the ejection channel, its closing does not reduce the flow of air from the ejection channel into the cooling channel. The overall stream F7 flowing through the heat exchanger 174 is the extension of the stream F6.

In summary, the second implementation can comprise, when the rotational speed of the propeller is lower than the first predetermined speed and greater than a second predetermined speed, a step of partially opening the variable bleed valve 176 so that air flows from the main channel 171 to the ejection channel 175, and optionally, if the ejection channel 175 opens into the cooling channel 173 downstream of the stream modulator 176, a step of reducing an air flow rate passing through the cooling inlet of the main channel 171 to the cooling channel 173.

In addition, the control method can further comprise, when the rotational speed of the unducted propeller is lower than a second predetermined speed lower than the first predetermined speed or when the dynamic pressure at the inlet of the main channel 170 passes below a minimum value, a step of totally opening the ejection channel 175 and a step of canceling an air flow rate passing through the cooling inlet of the main channel 171 to the cooling channel 173, the second predetermined speed may be comprised between 40% and 80% of a maximum rotational speed of the propeller.

The invention claimed is:

1. A method for controlling a gas turbine, the method comprising:

supplying air into a main channel through a main inlet, the main inlet being located between two unducted propellers of the gas turbine, producing compressed air by flowing the air supplied through a compression stage located in the main channel, producing a complementary airflow through an ejection channel, the ejection channel opening into the main channel and into a cooling channel, so that air passing through the ejection channel ventilates ana heat exchanger located in the cooling channel, the cooling channel extending from a cooling inlet, the cooling inlet opening into the main channel, the cooling inlet being located upstream of the compression stage with reference to a direction of flow of the air through the gas turbine, comparing a rotational speed of one of the unducted propellers with a first predetermined speed, and if the rotational speed exceeds the first predetermined speed, setting to zero a flow of the complementary airflow.

2. The method according to claim 1, wherein the first predetermined speed is equal to 80% of a maximum rotational speed of the unducted propeller.

3. The method according to claim 1, further comprising producing a cooling airflow flowing from the main channel into the cooling channel.

4. The method according to claim 3, further comprising controlling a flow of the cooling airflow based on a cooling requirement of the heat exchanger.

5. A gas turbine comprising:

two unducted propellers, a main channel comprising a main inlet, the main inlet being located between the two unducted propellers, a compression stage located in the main channel, the main channel being configured to supply the compression stage with air, a cooling channel extending from a cooling inlet opening into the main channel, the cooling inlet being located upstream of the compression stage with reference to a direction of flow of the air through the gas turbine, a heat exchanger located in the cooling channel, an ejection channel opening into the main channel and into the cooling channel so that air passing through the ejection channel ventilates the heat exchanger, and a variable bleed valve configured to adjust an air flow rate in the ejection channel.

6. The gas turbine according to claim 5, wherein the variable bleed valve comprises a rotary valve configured to be rotated.

7. The gas turbine according to claim 5, wherein the variable bleed valve comprises a sliding door.

8. The gas turbine according to claim 5, further comprising an airflow modulator configured to adjust a flow rate of an airflow passing through the cooling inlet from the main channel to the cooling channel.

9. The gas turbine according to claim 8, wherein the airflow modulator is placed at the cooling inlet.

10. The gas turbine according to claim 8, wherein the airflow modulator is placed at a cooling outlet of the cooling channel, the modulator comprising a rotary valve configured to be rotated.

11. The gas turbine according to claim 8, wherein the airflow modulator comprises a variable section of the cooling channel.

12. An aircraft comprising the gas turbine according to claim 5.

13. The gas turbine according to claim 5, wherein the heat exchanger is located at an intersection between the cooling channel and the ejection channel.

14. The gas turbine according to claim 5, further comprising a speed reduction gearbox configured to drive in rotation one of the unducted propellers, the heat exchanger being configured to ensure a cooling of the speed reduction gearbox.

\* \* \* \* \*